United States Patent Office 2,934,564
Patented Apr. 26, 1960

2,934,564
ORGANOHALOPHOSPHINES

Anton B. Burg, Los Angeles, and Ross I. Wagner, Montebello, Calif., assignors, by mesne assignments, to American Potash & Chemical Corporation, a corporation of Delaware No Drawing. Application November 8, 1957
Serial No. 695,225

13 Claims. (Cl. 260—543)

This invention relates in general to the preparation of alkyl and aryl substituted halophosphines and more particularly to compounds of the general formula $R_2PX$ and $RPX_2$, wherein R represents an alkyl or aryl group and X represents chlorine, bromine or iodine and compounds of the type $R(PX_2)_2$ where R is a polymethylene or arylene group.

Phosphinoborine compounds of the general type RR′PBR″R‴ represent a new group of basically inorganic polymers having high chemical and thermal stability. Those compounds having organic radicals in the R and R′ positions form trimeric rings as set forth in copending application Serial No. 446,147, filed July 27, 1954, now abandoned, for "Phosphinoborine Compounds and Their Preparation." These compounds find particular utility in applications where heat resistant polymers are desired. For example, the compound $$[(CH_3)_2PBH_2]_3$$

has a spontaneous ignition temperature in excess of 240° C. and certain samples of this type of compound have shown spontaneous ignition temperatures as high as 300° C. It is also an excellent dielectric and thus finds utility where chemically and thermally stable dielectrics are needed.

The ignition temperatures of most of these compounds decrease somewhat as the alkyl or aryl chains increase in size, thus rendering the compounds more hydrocarbon-like. However, the ignition temperature still remains considerably in excess of those of most of the organic polymeric materials. The compound [(CH$_3$)$_2$PBH$_2$]$_3$ has a melting point of 87° C. When the hydrocarbon chain on the phosphorus is increased in length, the melting point decreases. For example, the compound $$[(CH_3)C_2H_5PBH_2]_3$$

has a melting point in the neighborhood of 0° C. and yet still has many of the same properties described above which are common to the general class of compounds. The spontaneous ignition temperature is in excess of 220° C. Thus, wherever it is desired to employ a hydraulic fluid which has high resistance to the effects of elevated temperatures and resists chemical attack, these liquid phosphinoborine polymers find utility.

A variety of methods has been set forth in the aforementioned copending application for the manufacture of these phosphinoborine polymers, but simpler synthetic procedures have been sought.

It is therefore an object of this invention to provide a process of preparing new compounds which are valuable as intermediates in the preparation of the aformentioned phosphinoborine polymers.

It is a further object of this invention to provide a method for the manufacture of compounds, these compounds having the general formulae $R_2PX$ and $RPX_2$ wherein R represents the same or different alkyl or aryl substituents and X represents bromine, chlorine or iodine, and compounds of the type $X_2P$—R—$PX_2$ where R is a polymethylene or arylene radical, these methods being procedures which may be readily practiced with available reagents.

Other objects and advantages of this invention, if not specifically set forth, will become apparent during the course of the discussion which follows.

Generally, it has been found that where a single mole of an aminophosphine of the type $R_2PNR'_2$ or $RP(NR'_2)_2$ is reacted with 2 moles and 4 moles respectively of HX, a product is obtained having the general formula $R_2PX$ or $RPX_2$. Where a single mole of a compound of the type $(R'_2N)_2PRP(NR'_2)_2$, R being arylene or polymethylene, is treated with 8 moles HX, a product is obtained having the general formula $X_2PRPX_2$.

More particularly, a method of making deceptively simple compounds of the alkyl and aryl halophosphine-type [especially $(CH_3)_2PCl$, $(CH_3)_2PBr$, $(CH_3)_2PI$, $CH_3PCl_2$, $CH_3PBr_2$ and $CH_3PI_2$] for their value as intermediates in the manufacture of certain stable phosphinoborine compounds has long been sought. It has now been discovered that the formation of certain of these intermediates as well as compounds having larger organic radicals bonded to the P atom may be represented generally by the formulae, $$R'_2NPR_2 + 2HX \rightarrow R'_2NH_2X + R_2PX$$
$$(R'_2N)_2PR + 4HX \rightarrow 2R'_2NH_2X + RPX_2$$

Where an aromatic aminophosphine compound of the type $p-C_6H_4(P[N(CH_3)_2]_2)_2$ or a polymethylene aminophosphine of the type $(CH_2)_x(P[N(CH_3)_2]_2)_2$ where $x=4-6$ is used as a precursor, each amino substituent on each phosphorus will be replaced by a halogen; and the equation representing preparation of the product is analogous to the second of the two set out above:

$$(R'_2N)_2PRP(NR'_2)_2 + 8HX \rightarrow 4R'_2NH_2X + X_2PRPX_2$$

In applicant's preliminary tests, the treatment of compounds of the type $(CH_3)_2NP(CH_3)_2$ with slightly more than two equivalents of HCl yielded a product which, while possibly containing the desired $(CH_3)_2PCl$, also contained such an excess of HCl that it was impossible to isolate the desired dialkyl chlorophosphine. The excess HCl could not be removed either by distillation methods or by reaction with a tertiary amine. However, it has now been found that when the quantities of $R_2NPR_2$ and HCl are adjusted so that exactly one equivalent of the former is present for two of the latter, the compound having the formula $R_2PCl$ is cleanly obtained without necessity for the aforementioned removal of excess HCl.

Similarly, in preparing other compound of the type $R_2PX$, $RPX_2$ and $R(PX_2)_2$, it has been determined that the quantity of hydrohalogen acid must be carefully controlled as dictated by the equations above.

Preparation of the amino-organophosphines used as precursors may be accomplished through the method set forth in copending application Serial No. 593,365, filed June 25, 1956 for Manufacture of Aminophosphines. Alternatively, aminohalophosphines may be prepared by the method first described by Michaelis, Ann., 326,129 (1903) and thereafter treated with a Grignard reagent to yield the desired amino-organophosphine precursor. For illustrative purposes, the preparation of amino-organophosphines is set out in certain of the examples.

As is apparent from these examples, the symbol "R" in the general formulae $RPX_2$ and $R_2PX$ represents any hydrocarbon radical capable of forming a Grignard or organolithium reagent and the symbol "R" in $R(PX_2)_2$ must be an aliphatic or aromatic radical which may form a double Grignard or organolithium reagent. In the compound $R(PX_2)_2$, R may be $(C_6H_4)$ or $(CH_2)_x$ where $x=4-6$.

Various examples are set forth below by way of illustration, but are not to be deemed as imposing limitations

EXAMPLE I

A 5.284 mmole sample of $(CH_3)_2NP(CH_3)_2$ and 7.912 mmoles of HCl were combined in a 50 ml. vertical reaction tube attached to the high-vacuum apparatus, with slow warming from $-78°$ C. to room temperature. The volatile product now had physical properties indicative of purity; for example, the molecular weight of the 80 percent saturated vapor was measured as 97.9; calcd., 96.5. The melting range was narrow: $-1.4°$ to $-1.0°$ C. The vapor tensions also were consistent with purity; the values for the solid, shown in Table 1 determine the equation $\log_{10}P_{mm} = 12.1408 - 2887/T$, while those for the liquid (Table 2) are fairly consistent with the equation $\log_{10}P_{mm} = 7.884 - 1722/T$. This would indicate the normal B.P. as 71° C., but since the Trouton constant (22.9 cal./deg.mole) is a little above normal, the true B.P. probably is nearer to 73° C. From the two equations, the heat of fusion is calculated as 5.33 kcal./mole and the M.P. as $-2.0°$ (obsd. $-1.4°$ to $1.0°$ C.).

The aminolysis of $(CH_3)_2PCl$ was repeated, using an almost pure sample (0.437 mmole) with 0.947 mmole of $(CH_3)_2NH$. The result was a 92 percent yield of $(CH_3)_2NP(CH_3)_2$; and an analysis of the by-product $(CH_3)_2NH_2Cl$ gave the calculated 0.437 mmole of $Cl^-$. This experiment completes the proof of the formula $(CH_3)_2PCl$.

Table 1

[Vapor tensions of solid $(CH_3)_2PCl$]

| $t$(° C.) | -39.8 | -34.0 | -27.4 | -18.6 | -12.2$_3$ | -5.5 |
|---|---|---|---|---|---|---|
| $P_{mm}$ (obsd.) | 0.57 | 1.19 | 2.44 | 6.31 | 11.92 | 22.62 |
| $P_{mm}$ (calcd.) | 0.59 | 1.17 | 2.47 | 6.31 | 11.91 | 22.63 |

Table 2

[Vapor tensions of liquid $(CH_3)_2PCl$]

| $t$(° C.) | 0.00 | 2.4 | 9.4 | 15.3 | 19.8$_3$ | 21.7 | 33.1 |
|---|---|---|---|---|---|---|---|
| $P_{mm}$ (obsd.) | 34.6 | 39.5 | 56.6 | 74.9 | 91.5 | 99.5 | 168.7 |
| $P_{mm}$ (calcd.) | 34.7 | 39.4 | 56.2 | 74.9 | 92.6 | 100.9 | 166.5 |

EXAMPLE II

Dimethylamine in the amount of 177 g. (3.92 moles), when bubbled into 273 g. (1.99 moles) phosphorus trichloride in 1000 ml. of dry diethyl ether under a nitrogen atmosphere, gave a precipitate of dimethylammonium chloride. During the reaction, the vessel was cooled in an ice bath. The ethereal filtrate was fractionally distilled to yield 191.3 g. (1.32 moles) dimethylaminodichlorophosphine, $(CH_3)_2NPCl_2$, (67 percent), B.P. 147° C.

21.4 g. $(p-CH_3C_6H_4)_2PN(CH_3)_2$ was prepared in 19.8 percent yield from 61.0 g. (0.42 mole) $(CH_3)_2NPCl_2$ in a well stirred solution and 0.84 mole $p-CH_3C_6H_4MgBr$, each in 1000 ml. diethyl ether. Purification of the product dimethylaminodi-p-tolylphosphine was accomplished in a molecular still at 85–95° C. at $10^{-4}$ mm. Combustion analysis showed C, 76.57; H, 8.06; calc. for $C_{16}H_{20}NP$, C, 74.68; H, 7.83.

1428 cc. (63.75 mmoles) anhydrous HCl was allowed to react with 8.6191 g. (31.88 mmoles) of $$(p-CH_3C_6H_4)_2PN(CH_3)_2$$

(assay 95.2 percent) in a 35 ml. diethyl ether. The by-product was determined to have formed in 98.3 percent yield by chloride analysis and the product, $$(p-CH_3C_6H_4)_2PCl$$

was isolated by fractional distillation. A total of 5.60 g. of product di-p-tolylchlorophosphine, B.$_1$ 165–8° C. was obtained in 70.6 percent yield.

EXAMPLE III

Using the same procedure as above but using 392 g. (8.70 moles) dimethylamine, 280 g. (2.04 moles) phosphorus trichloride, and 2700 ml. diethyl ether, a 212.4 g. (1.37 moles) quantity of bis(dimethylamino)chlorophosphine, $[(CH_3)_2N]_2PCl$, (B.$_{48}$ 93–7° C.) was prepared in 67 percent yield.

To a well-stirred solution of 17.5 g. (0.113 mole) of the $[(CH_3)_2N]_2PCl$ in 400 ml. diethyl ether maintained at $-75°$ C. was added 0.117 mole of $C_6H_5Li$ in 175 ml. diethyl ether. The reaction mixture was allowed to warm to room temperature. After removing ether by distillation, 250 ml. petroleum ether was added to precipitate lithium salts and the mixture was filtered in a nitrogen atmosphere. Fractional distillation of the filtrate yielded 17.5 g. (0.089 mole) bis(dimethylamino)phenylphosphine, $C_6H_5P[N(CH_3)_2]_2$, B.$_{0.02}$ 42–4° C. A 79 percent yield of liquid was obtained analyzing N 14.2; calc. for $C_{10}H_{17}N_2P$, N, 14.28.

A 926.7 cc. (41.37 mmoles) quantity of anhydrous HCl was absorbed by a solution of 2.0327 g. (10.35 mmoles) $C_6H_5P[N(CH_3)_2]_2$ in 15 ml. diethyl ether cooled to $-10\pm10°$ C. Complete adsorption which required 45 minutes was determined by the observation that the vapor pressure of the mixture was less than 0.5 mm. on lowering the temperature of the mixture to $-78°$ C. The by-product dimethylammonium chloride was filtered off and analyzed for chlorine (21.6 mmoles found). The solvent was stripped from the ethereal filtrate and the residue was subjected to fractional condensation. In a trap at $-10°$ C. 1.1650 g. (6.50 mmoles) of $C_6H_5PCl_2$ (62.8 percent yield) was obtained analyzing 38.1 percent chlorine (calc. 39.6 percent). The infrared spectrum of the product was identical to that of an authentic sample.

EXAMPLE IV

To a well-stirred solution of 34.0 g. (0.220 mole) $[(CH_3)_2N]_2PCl$ in 300 ml. diethyl ether maintained at $-78°$ C. was added 0.219 mole of $C_3H_7MgBr$ in 300 ml. diethyl ether. The reaction mixture was allowed to warm at room temperature and filtered in a nitrogen atmosphere. Fractional distillation of the filtrate yielded 11.7 g. bis(dimethylamino)propylphosphine, $$C_3H_7P[N(CH_3)_2]_2$$

A 32 percent yield of liquid was obtained.

Using the procedure of Example III, the 0.070 mole $C_3H_7P[N(CH_3)_2]_2$ was treated with 6377 cc. (0.28 mole) anhydrous HCl in 200 ml. diethyl ether. After removal of the by-product, dimethylammonium chloride, the solvent was stripped from the filtrate. The product, $$C_3H_7PCl_2$$

was isolated by fractional distillation at 140–2° C.

EXAMPLE V

The yellow organolithium solid $p-Li_2C_6H_4$ in the amount of 18.7 g. (0.208 mole) was slurried in 200 ml. petroleum ether and added over a period of 15 minutes with vigorous stirring to a solution of 105.2 g. (0.68 mole) of freshly distilled $[(CH_3)_2N]_2PCl$ in 1200 ml. of petroleum ether cooled to $-55°$ to $-60°$. The reaction mixture was stirred an additional 15 minutes and then 50 ml. of dry ethyl ether was added to the reaction mixture to insure complete reaction. This caused the reaction mixture to warm quickly to $-30°$ even though the reaction vessel was immersed in a $-78°$ cooling bath. The reaction mixture gradually cooled to $-70°$. Another 150 ml. of ethyl ether was then added and the reaction mixture gradually allowed to warm to room temperature (3 hours) and allowed to stand overnight. The reaction mixture was then brought to reflux and 26 g. (0.6 mole) of $(CH_3)_2NH$ was added to destroy any residual $[(CH_3)_2N]_2PCl$. The reaction mixture was then cooled to room temperature, filtered, and solvent removed by distillation to reduce the volume to about 300 ml. Upon cooling in an ice bath, a yield of 13.8 g. of colorless needles was obtained. The filtrate was distilled and yielded 32.9 g. (0.20 mole) of $[(CH_3)_2N]_3P$ (B.P. 60–61° at 18 mm.; percent N, found 25.4; calc. 25.75) plus an additional 3.33 g. of colorless crystalline material. Hot toluene extraction of the filter cake from the reaction mixture yielded an additional 14.0 g. of crystalline solid. Several recrystallizations of a small sample of the solid yielded a material, M.P. 146.5–147.5°, which analyzed N, 17.72; C, 57.37; H, 8.99; calc. for $$C_6H_4(P[N(CH_3)_2]_2)_2$$

N, 17.82; C, 53.49; H, 8.98. Total yield 31 g. (48 percent).

A 3.0137 g. (0.09587 mole) sample of the recrystallized p-bis[bis(dimethylamino)phosphino]benzene so prepared was suspended in 50 ml. dry ethyl ether at —78° C. A total of 1731.4 cc. (100.7 percent) of anhydrous HCl was added in 3 nearly equal portions. The reaction mixture was allowed to warm to room temperature between each addition of HCl. After the complete addition of HCl the reaction was allowed to warm to room temperature and stand overnight. The reaction mixture was filtered under $N_2$ to yield dimethylammonium chloride analyzing 0.0413 mole Cl⁻, (107 percent) and a clear filtrate. On removal of the ether by distillation and drying under vacuum 2.268 g. (85 percent) of colorless crystalline p-bis(dichlorophosphino)benzene were obtained M.P. 58–60°. Recrystallization from dry petroleum ether yielded a material that analyzed: Cl, 49.7; C, 26.32; H, 2.00; calcd. for $C_6H_4P_2Cl_4$: Cl, 50.7; C, 25.75; H, 1.43.

EXAMPLE VI

A 500 ml. ether solution of 136 g. (0.93 mole) of $(CH_3)_2NPCl_2$ and a 600 ml. ether solution of the double Grignard reagent made from 200 g. of 1,4-dibromobutane were simultaneously added to 500 ml. ether, being well stirred under dry nitrogen in a 2-liter 3-neck flask at —78° C. During the 2 hour period of introducing the reactants, the aminophosphorus chloride was kept in slight excess. The double Grignard solution tended to crystallize to a hard mass in the dropping funnel but was kept fluid through the use of an infra-red lamp.

The reaction produced a crystal mass which was stirred at —78° C. for an hour and then allowed to warm to room temperature during an additional hour. The loosely crystalline material then melted to a light brown, gummy mass which could not be stirred. After one hour of refluxing, the ether solution was decanted from the gum and the ether removed by distillation through a Vigreaux column. 9 g. of $C_4H_8PN(CH_3)_2$ were isolated by high vacuum distillation.

A by-product was obtained by returning the ether to the non-volatile residue and treating it with ammonia (200 g.) until there was no more warming and the gum had become crystalline. The filtered ether solution was now evaporated, yielding about 1 g. of the $C_4H_8PN(CH_3)_2$ and some 30 g. of a higher boiling liquid.

The 1 g. fraction was not pure sample, for the methyl iodide adduct (obtained by direct mixing) gave a higher than expected halide analysis. A sample of the 9 g. product from the ice reflux fractionation of the double Grignard product, as described above, was measured as 27.95 cc. of standard gas and weighed as 172.2 mg. Thus, the observed molecular weight was 138.0; calc. 131.6. This sample was then put through a process of conversion to $C_4H_8PCl$ by reaction with HCl. The 27.95 cc. sample absorbed 72.1 cc. of a 73.5 cc. sample of HCl, producing a nonvolatile solid and a volatile liquid. The molecular weight of the liquid product was measured as 130; calculated for $C_4H_8PCl$, 122.5. It may have contained a little of the ring phosphinamine, for the 23.3 cc. sample absorbed only 42.9 cc. of diethylamine in restoring the original compound according to the equation, $$C_4H_8PCl + 2(CH_3)_2NH \rightarrow (CH_3)_2NH_2Cl + C_4H_8PN(CH_3)_2$$

The chlorine determination on the nonvolatile product ran 32 percent high accounting for the excess use of the HCl in the formation of the $C_4H_8PCl$.

EXAMPLE VII

In the fashion set forth above, (Example II), 13.21 g. (0.120 mole) $[(CH_3)_2N]_2PCl$ was placed in 300 ml. diethyl ether. To this was added 0.121 mole (18.91 g.) of $C_4H_9MgBr$ in 300 ml. diethyl ether. The reaction was allowed to proceed at room temperature. The product was purified in a molecular still. Thereafter 0.071 mole of $C_4H_9P[N(CH_3)_2]_2$ (11.72 g.) in 75 ml. $(C_2H_5)_2O$ was treated with 0.284 mole anhydrous HCl. After removal of diethylammonium chloride the solvent was stripped from the filtrate. The product, $C_4H_9PCl_2$, boiling at 157–160° C., was isolated by fractional distillation.

EXAMPLE VIII

In fashion analogous to that set forth above, the aminophosphine $i$-$C_5H_{11}P[N(CH_3)_2]_2$ was prepared from approximately equal molar quantities of the bis(dimethylamino)chlorophosphine and the isoamyl magnesium bromide Grignard reagent. The yield was 7.99 g. (0.042 mole). This, in turn, was dissolved in 100 ml. diethyl ether and treated with 0.168 mole anhydrous HCl. In the manner described above, the by-product dimethylammonium salt was removed by filtration and the solvent was stripped from the ethereal filtrate. The product, $i$-$C_5H_{11}PCl_2$, was isolated by fractional condensation at —31° C. as in Example III.

EXAMPLE IX

In the fashion of Example VII the material $C_4H_9MgBr$ was reacted with bis(dimethylamino)chlorophosphine. The product, $C_4H_9P[N(CH_3)_2]_2$, in the amount of 0.14 mole in 80 ml. diethyl ether was treated with 0.56 mole anhydrous HBr. The diethylammonium bromide was removed from the mixture by filtration and the product, $C_4H_9PBr_2$ isolated by fractional distillation, at reduced pressure, B.$_{10}$ 80–95° C.

EXAMPLE X

Using the procedure set forth above, $C_6H_5PBr_2$ was prepared by treating 0.083 mole $C_6H_5P[N(CH_3)_2]_2$ (16.698 g.) in 75 ml. diethyl ether with 0.252 moles anhydrous HBr. The product, $C_6H_5PBr_2$ B. 255–7° C. was isolated following removal of the dimethylammonium bromide.

EXAMPLE XI

In substantially the same manner, 24.5 g. (0.158 mole) bis(dimethylamino)phenylphosphine in 60 ml. diethyl ether was treated with 0.632 mole anhydrous HI. The dimethylammonium iodide was removed from the reaction mixture and the product isolated by fractional distillation. The product, $C_6H_5PI_2$, was obtained as a crude solid.

EXAMPLE XII

The bis(dimethylamino)chlorophosphine was prepared as set forth in Example III above. Thereafter 15.06 g. of this material (0.103 mole) were placed in solution with 500 ml. diethyl ether maintained at —75° C. To this was added 0.105 mole (13.81 g.) 1-$C_{10}H_7Li$ in 200 ml. diethyl ether. The reaction mixture was allowed to warm to room temperature and the ether thereafter removed by distillation. In the fashion set forth in Example III above, the lithium salts were precipitated and the mixture filtered. The bis(dimethylamino)naphthylphosphine in the amount of 0.074 mole (18.23 g.) was dissolved in 100 ml. $(C_2H_5)_2O$ and thereafter treated with 0.296 mole anhydrous HCl. On fractional distillation of the reaction mixture a fair yield of i-$C_{10}H_7PCl_2$ was obtained, B.$_{10}$ 180°, M. 58–9°.

EXAMPLE XIII

In a fashion similar to that set forth in Example XII above, the bis(dimethylamino)naphthylphosphine was treated with HBr to yield 1-$C_{10}H_7PBr_2$. 6.65 g. (0.027 mole) of $C_{10}H_7P[N(CH_3)_2]_2$ were treated with 0.108 mole anhydrous HBr.

EXAMPLE XIV

A 3.842 g. sample of $(CH_3)C_2H_5PN(CH_3)_2$ (32.25 mmoles) was treated with 64.53 mmoles of HCl, the reaction occurring vigorously below −78° C. The reaction mixture was warmed to room temperature and the volatile product removed and found to be $(CH_3)C_2H_5PCl$, B. 157–60° C.

EXAMPLE XV

A 3.489 g. sample of $(CH_3)_2NP(C_2H_5)_2$ (26.2 mmoles) was treated with 52.5 mmoles of HBr. Initially the reaction vessel was cooled to less than −65° C. and, following completion of the reaction, the volatile product was removed and found to be $(C_2H_5PBr$, B.$_{15}$ 130–35° C.

EXAMPLE XVI

A 44.11 mmoles quantity of anhydrous HCl was absorbed in a solution of 3.951 g. (22.05 mmoles) $(CH_3)_2NP(C_4H_9)_2$ in 15 ml. diethyl ether cooled to about −10° C. The by-product, dimethylammonium chloride, was filtered off and the solvent stripped from the ethereal filtrate and the residue was subjected to fractional distillation. A fair yield of the $(C_4H_9)_2PCl$ was thus obtained, B.$_{15}$ 120–5° C. In substantially the same fashion, using HBr instead of HCl, the material $(C_4H_9)_2PBr$ was obtained.

EXAMPLE XVII

To a well-stirred solution of 0.201 mole $(CH_3)_2NPCl_2$ in 400 ml. diethyl ether was added 0.402 mole $C_6H_5MgBr$, also in 400 ml. diethyl ether. The product, $$(CH_3)NP(C_6H_5)_2$$

was purified as set forth in Example II above and thereafter 8.213 g. (0.0541 mole) of this material were placed in 50 ml. diethyl ether and allowed to react with 0.109 mole HBr. The by-product was removed and the product $(C_6H_5)_2PBr$, isolated by fractional distillation, B.$_{15}$ 183–84° C.

EXAMPLE XVIII

Dimethylaminodinaphthylphosphine, $$(CH_3)_2NP(1-C_{10}H_7)_2$$

in the amount of 8.563 g. (26.0 mmole) was dissolved in 50 ml. diethyl ether. Thereafter 52.8 g. mmoles HCl were bubbled into the solution. The reaction occurred vigorously, following which time the by-product was filtered from the solution and the dinaphthylchlorophosphine, $(1-C_{10}H_7)_2PCl$, B.$_{15}$ 270–80° C., removed from the solvent by fractional distillation. The compound $(1-C_{10}H_7)_2PBr$, melting at 29–30° C., B.$_{15}$ 280–300° C., was prepared from the same aminophosphine and hydrobromic acid by reaction of 21.43 mmoles of the former with 42.87 mmoles of the latter.

EXAMPLE XIX p-Bis[bis(dimethylamino)phosphino]benzene $$p\text{-}C_6H_4(P[N(CH_3)_2]_2)_2$$

was prepared as set out in Example V above. Thereafter 13.97 g. (45 mmoles) were treated with 29.13 g. (360 mmoles) anhydrous HBr in 350 ml. diethyl ether. After removal of the by-product, dimethylammonium bromide, the solvent was stripped from the filtrate. The product, p-bis(dibromophosphino)benzene, p-$C_6H_4(PBr_2)_2$, was isolated by distillation in the molecular still.

Results of additional runs are set forth in the table which follows:

| Example | Aminohalo-Phosphine | Grignard Reagent | Aminophosphine | Mols | Grams | HX | | Product |
|---|---|---|---|---|---|---|---|---|
| | | | | | | X | Mols | |
| XX | [$(C_2H_5)_2N]_2PCl$ | $(CH_2)_4(MgBr)_2$ | $(CH_2)_4(P[N(C_2H_5)_2]_2)_2$ | 0.0146 | 5.936 | Cl | 0.117 | $(CH_2)_4(PCl_2)_2$ |
| XXI | [$(C_2H_5)_2N]_2PCl$ | $(CH_2)_5(MgBr)_2$ | $(CH_2)_5(P[N(C_2H_5)_2]_2)_2$ | 0.00424 | 1.783 | Cl | 0.0339 | $(CH_2)_5(PCl_2)_2$ |
| XXII | [$(C_2H_5)_2N]_2PCl$ | $(CH_2)_6(MgBr)_2$ | $(CH_2)_6(P[N(C_2H_5)_2]_2)_2$ | 0.00534 | 2.321 | Cl | 0.0428 | $(CH_2)_6(PCl_2)_2$ |
| XXIII | $(C_2H_5)_2NPCl_2$ | $CH_3MgBr$ | $(C_2H_5)_2NP(CH_3)_2$ | 0.117 | 15.59 | Cl | 0.234 | $(CH_3)_2PCl$ |
| XXIV | $(C_2H_5)_2NPCl_2$ | $CH_3MgBr$ | $(C_2H_5)_2NP(CH_3)_2$ | 0.0930 | 12.39 | Br | 0.186 | $(CH_3)_2PBr$ |
| XXV | $(C_2H_5)_2NPCl_2$ | $CH_3MgBr$ | $(C_2H_5)_2NP(CH_3)_2$ | 0.0640 | 8.517 | I | 0.129 | $(CH_3)_2PI$ |
| XXVI | [$(C_2H_5)_2N]_2PCl$ | $CH_3MgBr$ | $CH_3P[N(C_2H_5)_2]_2$ | 0.0529 | 10.06 | Br | 0.212 | $CH_3PBr_2$ |
| XXVII | [$(C_2H_5)_2N]_2PCl$ | $CH_3MgBr$ | $CH_3P[N(C_2H_5)_2]_2$ | 0.0292 | 5.556 | I | 0.117 | $CH_3PI_2$ |
| XXVIII | [$(CH_3)_2N]_2PCl$ | $2\text{-}C_2H_5C_6H_4MgBr$ | $2\text{-}C_2H_5C_6H_4P[N(CH_3)_2]_2$ | 0.0611 | 13.71 | Cl | 0.244 | $2\text{-}C_2H_5C_6H_4PCl_2$ |
| XXIX | [$(CH_3)_2N]_2PCl$ | $2,4,6\text{-}(CH_3)_3C_6H_2MgBr$ | $2,4,6\text{-}(CH_3)_3C_6H_2P[N(CH_3)_2]_2$ | 0.0476 | 11.34 | Cl | 0.190 | $2,4,6\text{-}(CH_3)_3C_6H_2PCl_2$ |
| XXX | [$(CH_3)_2N]_2PCl$ | $4\text{-}CH_3C_6H_4MgBr$ | $4\text{-}CH_3C_6H_4P[N(CH_3)_2]_2$ | 0.0840 | 17.67 | Br | 0.336 | $4\text{-}CH_3C_6H_4PBr_2$ |
| XXXI | [$(C_2H_5)_2N]_2PCl$ | $p\text{-}C_6H_4(MgBr)_2$ | $p\text{-}C_6H_4(P[N(C_2H_5)_2]_2)_2$ | 0.122 | 52.0 | Br | 0.979 | $p\text{-}C_6H_4(PBr_2)_2$ |

The use of the compounds of the process of this invention containing only a single phosphorus atom to produce phosphinoborine compounds is set forth in U.S. Patent No. 2,892,873. The reaction described therein involves the monofunctional halophosphines of this invention and alkali metal borohydrides to yield metallic halides and phosphine borine compounds of the formula $$RR'HP:BH_2CH_3$$

R representing a hydrocarbon group and R' representing H or a hydrocarbon group. When heated to a temperature of between about 100° and 200° C., the phosphine borines lose hydrogen to yield phosphinoborines of the formula $[R_2PBHCH_3]_3$. These phosphinoborine products find utility as dielectrics. The use of diphosphines disclosed herein to produce difunctional phosphinoborines is set forth in our co-pending application Serial No. 695,230, filed November 8, 1957. As described therein, compounds of the type $R(PH_2)_2$ may be prepared by reducing with lithium aluminum hydride compounds of the type $R(PX_2)_2$. Any of the methods customarily used in the reduction of monofunctional organohalophosphines may be used also. The nonhalogenated intermediates may then be treated with sodium in equimolar quantities to yield a compound of the formula $H_2PRPNa$ which thereafter is treated with an alkyl halide (R'X) to yield a compound of the formula $H_2PRPHR'$. This in turn is treated again with an equimolar portion of sodium to form $NaHPRPHR'$, which is further treated with additional alkyl halide (R''X) to yield a compound of the formula $R''HPRPHR'$. This difunctional phosphine material is treated with diborane in equimolar quantities to yield a phosphine borine of the formula $$H_3B:PH(R')R(R'')HP:BH_3$$

which may be pyrolyzed at 80°–350° C. to yield a phosphinoborine of the formula $$[H_2PB(R')R(R'')PHB_2]_3$$

by driving off hydrogen from the phosphine borine. The reaction is carried out in accordance with the details set forth in the copending application Serial No. 695,230. As set forth there, the phosphinoborines so obtained display excellent dielectric properties and are thermally resistant. Thus, such phosphinoborines find utility where thermally and chemically resistant dielectrics are required.

Obviously many modifications and variations of the invention as hereinbefore set forth may be made without departing from the spirit and scope thereof, and therefore only such limitations should be imposed as are indicated in the appended claims.

We claim:

1. A compound of the general formula:

$$Y(PX_2)_2$$

wherein Y is selected from the group consisting of arylene, tetramethylene, pentamethylene and hexamethylene, and wherein X is a halogen selected from the group consisting of Cl, Br and I.

2. Compounds of the formula: $(CH_2)_n(PX_2)_2$ where $n$ is 4–6 and X is halogen from the group consisting of chlorine, bromine and iodine.

3. p-Bis(dichlorophosphino)benzene.
4. p-Bis(dibromophosphino)benzene.
5. 1,4-bis(dichlorophosphino)butane.
6. 1,5-bis(dichlorophosphino)pentane.
7. 1,6-bis(dichlorophosphino)hexane.
8. The process for the preparation of halophosphines comprising: treating an aminophosphine with hydrohalogen acid in about the stoichiometric quantity necessary to replace each of the amino groups on said aminophosphine with a halogen.

9. The process of claim 8 wherein the aminophosphine is dimethylaminodimethylphosphine and wherein the product is dimethylchlorophosphine.

10. The process of claim 8 wherein the aminophosphine is dimethylaminocyclotetramethylenephosphine and wherein the product is cyclotetramethylenechlorophosphine.

11. The process of claim 8 wherein the aminophosphine is dimethylaminodi-p-tolylphosphine and wherein the product is di-p-tolylchlorophosphine.

12. The process of claim 8 wherein the aminophosphine is bis(dimethylamino)phenylphosphine and wherein the product is phenyldichlorophosphine.

13. The process of claim 8 wherein the aminophosphine is p-bis[bis(dimethylamino)phosphino]benzene and wherein the product is p-bis(dichlorophosphino)benzene.

References Cited in the file of this patent

UNITED STATES PATENTS

| | | |
|---|---|---|
| 2,437,796 | Walling | Mar. 16, 1948 |
| 2,437,798 | Walling | Mar. 16, 1948 |
| 2,615,043 | Kharasch et al. | Oct. 21, 1952 |
| 2,662,917 | Jensen | Dec. 15, 1953 |

OTHER REFERENCES

Kosalapoff: Organo Phosphorus Compounds, pgs. 53–55 (1950).